United States Patent [19]

Butcher et al.

[11] 4,399,499

[45] Aug. 16, 1983

[54] BI-LATERAL FOUR QUADRANT POWER CONVERTER

[75] Inventors: James S. Butcher, Glendale Heights; Andrew Chan, Bensenville; Paul U. Lind, Lombard, all of Ill.

[73] Assignee: GTE Automatic Electric Labs Inc., Northlake, Ill.

[21] Appl. No.: 332,285

[22] Filed: Dec. 18, 1981

[51] Int. Cl.$^3$ .......................................... H02M 3/335
[52] U.S. Cl. ........................................ 363/17; 363/98; 363/127; 363/132
[58] Field of Search .................... 363/17, 41, 98, 127, 363/132

[56] References Cited

U.S. PATENT DOCUMENTS

| | | | |
|---|---|---|---|
| 3,588,671 | 6/1971 | Deboo et al. | 363/127 |
| 3,737,755 | 6/1973 | Calkin et al. | 363/17 |
| 3,745,440 | 7/1973 | Lord | 363/17 |
| 4,319,144 | 3/1982 | King et al. | 363/127 X |

FOREIGN PATENT DOCUMENTS 55-147982  11/1980  Japan ................................. 363/17

Primary Examiner—William M. Shoop
Assistant Examiner—Peter S. Wong
Attorney, Agent, or Firm—Gregory G. Hendricks; Robert J. Black

[57] ABSTRACT

A power converter which supplies AC or positive or negative DC output voltage with positive or negative current while isolating the output voltage from the input power source. This converter includes a pulse width modulator converts power amplitude signals to pulses of proportionate width. A power driver circuit applies these pulses to a sychronous demodulator and low pass filter via a pulse transformer. A low output impedance is presented to all output disturbances such that the converter can source or sink current in true four quadrant operation, including the passing of power from output to input when a load voltage exceeds the intended supply voltage.

13 Claims, 1 Drawing Figure

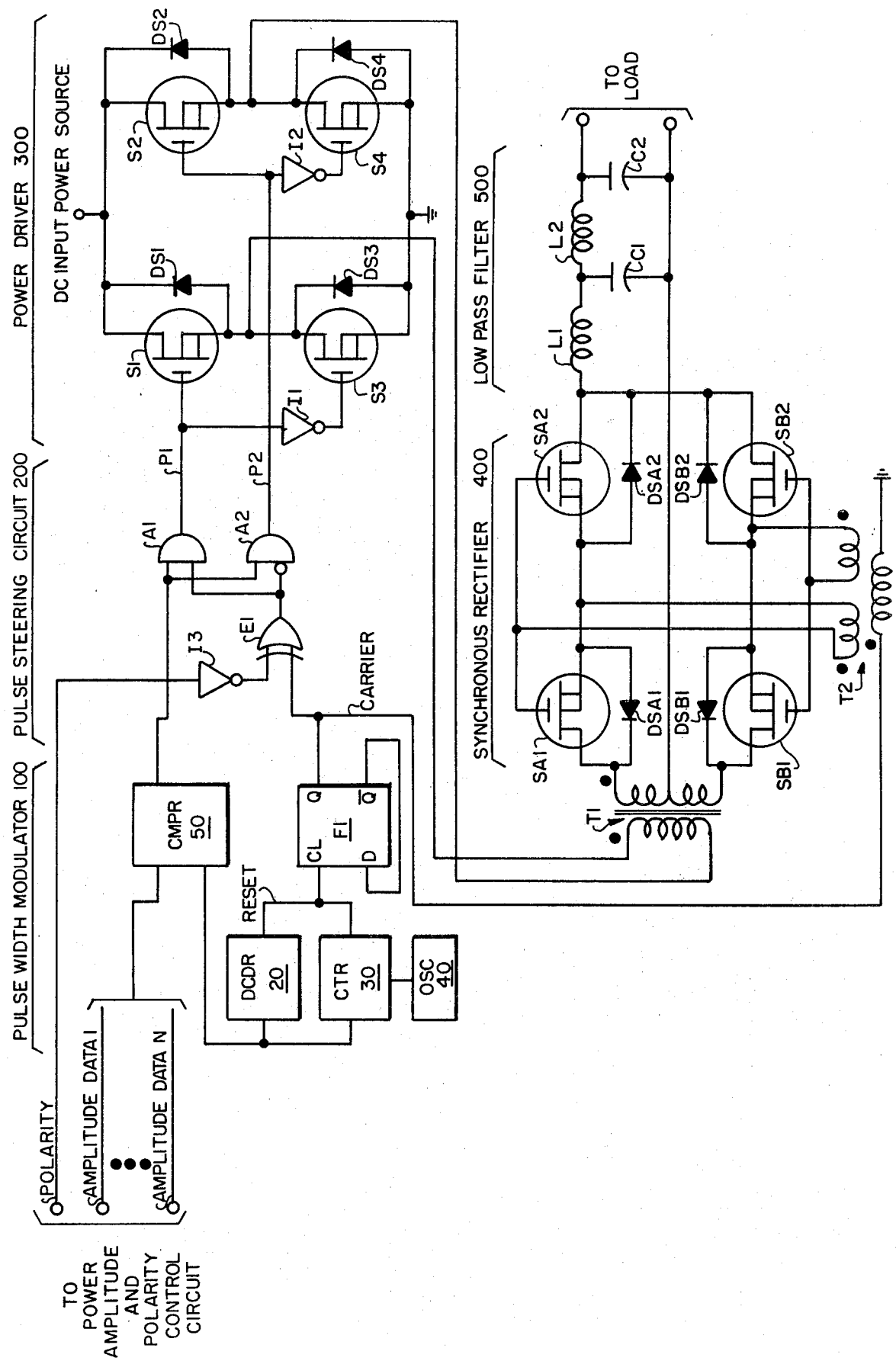

BI-LATERAL FOUR QUADRANT POWER CONVERTER

BACKGROUND OF THE INVENTION (1) Field of the Invention

The present invention relates to power supplies and more particularly to a bi-lateral four quadrant power converter.

(2) Description of the Prior Art

Four quadrant power converters are required for telephone ringing supply generators. Typically a high voltage (100 VRMS), low frequency AC signal is superimposed on a −50 VDC source. Four quadrant operation is required because, during ringing, only AC current flows into the load which may be highly reactive, causing the current to lead or lag the supplied AC voltage.

Most power converters supply a DC regulated output voltage in a single quadrant. An example of such a converter is a positive supply which delivers a positive current but cannot sink a negative current if power happens to be momentarily supplied by the load. Class AB DC coupled amplifiers, such as those used in high fidelity applications, can obtain isolation from the power source and provide four quadrant operation. However, to do this, two separate power supplies are used to supply current to a class AB linear or class D switching output stage. However, none of these amplifiers is bi-lateral and are therefore incapable of passing power in two directions.

Four quadrant operation is obtained in telephone ringing generators through use of the fixed office battery connected in series with a low frequency generator and having a large output coupling transformer. In such a generator both the battery and the transformer coupled generator, if driven appropriately, can carry current in both directions. However such an arrangement is inefficient and unsuitable for modern power requirements.

A recent advancement in the state of the art of power converters is the two quadrant converter disclosed by Slobodan Cuk at the IEEE Power Electronics Specialist Conference, 1977 record, pages 160-179. Two of these converters, one positive and one negative, could be connected in series to provide four quadrant operation. However, two supplies including two power pulse transformers are necessary to provide both output polarities.

Accordingly it is the object of the present invention to provide a bi-lateral, four quadrant power converter capable of not only applying power to the load but also passing power from output to input if the load voltage exceeds the intended supply voltage.

SUMMARY OF THE INVENTION

The present invention provides a low impedance voltage of variable amplitude and polarity while using only a single high frequency power transformer. Power is provided under an arrangement which can be described as the equivalent of double side band suppressed carrier (DSBSC) modulation. The DSBSC signal is pulse width modulated rather than amplitude modulated. This pulse width modulated signal is applied to a high frequency pulse transformer as a positive pulse followed by a negative pulse in order to remove any DC component. The width of the pulses controls the amplitude of the output voltage. The output of the pulse transformer drives a full wave synchronous rectifier composed of bidirectional field effect transistor (FET) switches. These switches are gated on and off by the same carrier signal which is used to produce a primary pulse width modulated power signal. The rectified pulses are applied to a low pass filter which provides the analog power to the load. True bi-lateral operation is achieved since the power transformer can supply power to the load via the power driver circuit and it can also sink power to ground via this power driver circuit.

DESCRIPTION OF THE DRAWING

The single FIGURE of the accompanying drawing is a combined logic and circuit diagram of a four quadrant power converter in accordance with the present invention.

DESCRIPTION OF THE PREFERRED EMBODIMENT

Referring now to the accompanying drawing the bi-lateral four quadrant power converter of the present invention is shown. This power converter includes pulse width modulator 100 which is shown connected to the power amplitude and polarity control circuit. Power driver 300 is connected to pulse width modulator 100 via pulse steering circuit 200. Power transformer T1 is connected between power driver 300 and synchronous rectifier 400 which is connected to a load via low pass filter 500.

Pulse width modulator 100 includes a digital magnitude comparator 50 having one input connected to the power amplitude and polarity control circuit via amplitude data leads. Oscillator 40 drives counter 30, which includes a parallel output connected to another input port of comparator 50 and to decoder 20. This decoder resets counter 30 at a predetermined count and also toggles D-type flip-flop F1.

Pulse steering circuit 200 includes inverter 13 and gates E1, A1 and A2 connected to the power amplitude and polarity control circuit, comparator 50 and flip-flop F1. Power driver 300 includes power switches S2 and S4 connected between gate A2 and the primary winding of transformer T1. It also includes power switches S1 and S3 connected between gate A1 and the primary winding of transformer T1.

The secondary winding of transformer T1 is connected to synchronous rectifier switches SA1-2 and SB1-2 of synchronous rectifier 400. These switches are also connected to D-type flip-flop F1 via transformer T2. Switches SA2 and SB2 are further connected to low pass filter 500.

Under this arrangement a typical source of the amplitude data signals would be a microprocessor. An alternative arrangement could comprise an analog control circuit which applies analog amplitude signals to comparator 50 via an analog-to-digital converter. Oscillator 40 clocks counter 30 which periodically provides a range of output signals from a minimum to a maximum counter value. Decoder 20 detects the maximum value of counter 30 and applies a reset signal to counter 30 to reinitiate the counting sequence of counter 30. Counter 30 also applies its parallel output signals to comparator 50 which uses them as a reference for determining whether amplitude signals are greater or less than this reference signal.

Decoder 20 also applies the reset signal to the clock input of D-type flip-flop F1. Since the Q output of this flip-flop is connected to the D input, this flip-flop will toggle on every reset signal. Thus flip-flop F1 alternately enables gates A1 and A2 during each alternate counting sequence of counter 30. Flip-flop F1 also applies this alternating enable signal to synchronous rectifier 400 which uses it as a carrier signal.

If an amplitude signal has been applied to comparator 50 it generates the leading edge of a pulse when the counter is reset. The width of this pulse is proportional to the amplitude of the input signal. Similarly the trailing edge of this pulse is generated when the counter value is equal to the amplitude of the input signal. This pulse is then applied to gates A1 and A2. These gates are enabled by the carrier signal from flip-flop F1 and the polarity signal. This carrier signal is a square wave having a frequency significantly higher than the highest desired output frequency of the converter. Since the comparator provides an output pulse which begins every time the counter is reset, gates A1 and A2 pass pulses, phase 1 and phase 2, depending on the logic level output of gate E1.

Exclusive-or gate E1 operates to pass or invert the carrier signal from flip-flop F1 depending on the polarity signal from the amplitude and polarity control circuit. If the polarity signal is at a logic level 1, it is inverted to a logic level 0 by inverter I3. Gate E1 then passes the carrier signal unchanged. However if the polarity signal is at a logic level 0, it is inverted to a logic level 1 by inverter I3 and then gate E1 inverts the carrier signal. Therefore if the polarity signal is at a logic level 1, gate A1 supplies pulses during positive carrier excursions and gate A2 supplies pulses during negative carrier excursions because of its inverting input. The opposite is true when the polarity signal is negative. In this case gates A1 and A2 pass pulses during the opposite carrier polarity. Thus gates A1 and A2 can never output simultaneous pulses.

Power driver 300 operates to supply two-phase bipolar pulses to transformer T1. When gate A1 is turned on it causes switches S1 and S4 to conduct, thereby causing a positive pulse to appear at the primary and secondary winding "start" terminals of pulse transformer T1. Conversely, when gate A2 is turned on (gate A1 turned off) it causes switches S2 and S3 to conduct thereby causing a negative pulse to appear at the primary and secondary winding "start" terminals of pulse transformer T1. If neither gate A1 nor gate A2 is turned on switches S3 and S4 turn on and clamp the primary voltage of T1 to zero volts.

When the polarity signal is positive gate A1 passes a width modulated pulse during the logic level 1 state of the carrier signal from flip-flop F1, and gate A2 produces a similar pulse when the carrier signal is at a logic level zero. Power driver 300 converts these positive pulses to a positive pulse followed by a negative pulse. These pulses appear at the start terminals of transformer T1 when the carrier signal is at a logic level 1 and 0 respectively. When the carrier signal is at a logic level 1, transformer T2 turns on synchronous rectifiers switches SA1 and SA2. The positive pulse is then conducted to filter 500 and its output via switch SA1 and diode DSA2. When the carrier signal switches to a logic level 0, a negative pulse appears at the start terminals of transformer T1. At this time, due to its winding polarity, transformer T2 enables synchronous rectifiers switches SB1 and SB2. A positive pulse is then passed to filter 500 and its output, via switch SB1 and diode DSB2. Thus, when the polarity signal is positive, only positive pulses are passed by synchronous rectifier 400 to filter 500 and its output. Since the width of these pulses is proportional to the amplitude control signal, filter 500 will produce the proper amplitude signal at its output.

Similarly, when the polarity control signal is negative (or logic level 0), negative pulses appear at transformer T1's secondary start terminal. When the carrier signal is at a logic level 1, switches SA1 and SA2 are again turned on and pass the negative pulses to filter 500 and its output via switch SA1 and diode DSA1. When the carrier signal is at a logic level 0 switches SB1 and SB2 are again turned on and pass the negative pulses to filter 500 and its output via switch SB2 and diode DSB1. Filter 500 then applies an analog power signal to the load by averaging the rectified pulsing power signals from synchronous rectifier 400.

It should be noted that, when enabled, both the SA1-SA2 pair of switches and the SB1-SB2 pair of switches can conduct current in either direction via diodes DSA1-DSA2 and DSB1-DSB2. True bi-lateral operation is then achieved when the load voltage, which appears at the primary side of transformer T1, after being chopped by the synchronous rectifier 400, exceeds the DC input power source voltage. Since switches S1-S4, and S2-S3 conduct in pairs, if the load voltage exceeds the pulse voltages at the secondary winding of transformer T1 these switch pairs will conduct in a direction opposite of that described above. During that part of the cycle when switches S1 and S4 are enabled, reverse current in the secondary winding of transformer T1 is reflected in the primary of T1. This current then flows to the DC source via diodes DS1 and DS4. Similarly, when switches S2 and S3 are enabled reverse current flows to the DC source via diodes DS2 and DS3. This reverse current flow only occurs when pulses are provided by pulse width modulator 100. If a very low output is to be applied to the load, switches S3 and S4 conduct as a pair most of the time, thereby shunting excess output current to ground.

Thus the present invention discloses a novel arrangement for providing bi-lateral four quadrant power. A pulse width modulator applies power control signals to a bidirectional power driver which applies power to a low pass filter via a power transformer and a bidirectional synchronous rectifier.

It will be obvious to those skilled in the art that numerous modifications of the present invention can be made without departing from the spirit of the invention which shall be limited only by the scope of the claims appended hereto.

What is claimed is:

1. A power converter for use in a power supply system including a variable electrical load and a power control circuit operated to provide positive and negative polarity signals and a plurality of power amplitude data signals, said power converter comprising:

pulse width modulation means connected to said power control circuit, operated in response to said power amplitude data signals to periodically provide a pulse width modulated signal having a pulse width proportional to the amplitude defined by said power amplitude data signals;

voltage control means connected to said pulse width modulation means, operated in response to said pulse width modulated signal and said positive polarity signal to provide a positive output voltage signal, and further operated in response to said pulse width modulated signal and said negative polarity signal to provide a negative output voltage signal; and filter means connected to said voltage control means, operated to provide an averaged positive output voltage of a magnitude proportional to the average pulse width of said positive output voltage signal and further operated to provide an averaged negative output voltage of a magnitude proportional to the average pulse width of said negative voltage signal;

said load operated in response to a load voltage less than said averaged positive output voltage to sink current from said voltage control means;

said voltage control means operated in response to a load voltage greater than said averaged positive output voltage to sink current from said load;

said load further operated in response to a load voltage less than said averaged negative output voltage to sink current from said voltage control means; and said voltage control means further operated in response to a load voltage greater than said averaged negative output voltage to sink current from said load.

2. A power converter as claimed in claim 1, wherein said pulse width modulation means is further operated to provide a periodic carrier signal of alternating first and second characteristics, said voltage control means comprising:

power driving means connected to said pulse width modulation means, operated in response to said pulse width modulated signal, said carrier signal of said first characteristic and said positive polarity signal to provide a power driving signal of positive polarity, and further operated in response to said pulse width modulated signal, said carrier signal of said first characteristic and said negative polarity signal to provide a power driving signal of negative polarity, and further operated in response to said pulse width modulated signal, said carrier signal of said second characteristic and said positive polarity signal to provide said power driving signal of negative polarity, and further operated in response to said pulse width modulated signal, said carrier signal of said second characteristic and said negative polarity signal to provide said power driving signal of positive polarity; and synchronous rectifying means connected to said power driving means operated in response to said power driving signal of said positive polarity and said carrier signal of said first characteristic to provide said positive output voltage signal;

further operated in response to said power driving signal of said positive polarity and said carrier signal of said second characteristic to provide said negative output voltage signal;

further operated in response to said power driving signal of said negative polarity and said carrier signal of said first characteristic to provide said negative output voltage signal; and further operated in response to said power driving signal of said negative polarity and said carrier signal of said second characteristic to provide said positive output voltage signal.

3. A power converter as claimed in claim 2, wherein said pulse width modulator comprises:

an oscillator operated to provide a plurality of pulses;

a counter operated to count said pulses and provide output signals representative of the number of pulses counted;

a decoder connected to said counter operated in response to a predetermined pattern of counter output signals to provide a reset signal;

said counter further operated to reset in response to said reset signal; and a comparator connected to said counter operated in response to said counter being reset and said power amplitude data signals to initiate a width modulated pulse;

said comparator further operated in response to said amplitude data signals having a magnitude equal to the magnitude of said counter output signals to terminate said width modulated pulse.

4. A power converter as claimed in claim 3, wherein said pulse width modulator further comprises:

a flip-flop connected to said decoder, operated in response to alternate occurrences of said reset signal to provide said carrier signal of said first and second characteristics, respectively.

5. A power converter as claimed in claim 2, wherein said power driving means comprise:

pulse steering means connected to said pulse width modulation means and said power control circuit operated in response to said positive polarity signal and said carrier signal of said first characteristic to provide a first enable signal;

a further operated in response to said positive polarity signal and said carrier signal of said second characteristic to provide a second enable signal;

further operated in response to said negative polarity signal and said carrier signal of said first characteristic to provide said second enable signal;

further operated in response to said negative polarity signal and said carrier signal of said second characteristic to provide said first enable signal; and gating means connected to said pulse steering means and said pulse width modulation means operated in response to said first enable signal and said pulse width modulated signal to provide a positive pulse width modulated signal;

further operated in response to said second enable signal and said pulse width modulated signal to provide a negative pulse width modulated signal; and power switching means connected to said gating means, operated in response to said positive pulse width modulated signal to provide said power driving signal of positive polarity and further operated in response to said negative pulse width modulated signal to provide said power driving signal of negative polarity.

6. A power converter as claimed in claim 5, wherein there is further included, a direct current voltage source, said power switching means comprising:

a pulse transformer;

a first switching circuit connected to said pulse transformer, operated in response to said positive pulse width modulated signal to pass current from said direct current voltage source through said pulse transformer in a first direction; and a second switching circuit connected to said pulse transformer, operated in response to said negative pulse width modulated signal to pass current from said direct current voltage source through said pulse transformer in a second direction;

said pulse transformer operated in response to current flow of said first direction to provide said power driving signal of said positive polarity, and further operated in response to current flow of said second direction to provide said power driving signal of said second polarity.

7. A power converter as claimed in claim 6, wherein said first and second power switching circuits comprise a pair of transistors with shunting diodes, said transistors operated to allow current to flow from said direct current voltage source when said load voltage is less than said averaged positive output voltage or greater than said averaged negative output voltage;

said diodes operated to allow current to flow to said direct current voltage source when said load voltage is less than said averaged negative output voltage or greater than said averaged positive output voltage.

8. A power converter as claimed in claim 7, wherein one of each pair of said transistors are further operated in response to an absence of said positive pulse width modulated signal and said negative pulse width modulated signal to connect said pulse transformer to ground, whereby a low impedance is presented to said load.

9. A power converter as claimed in claim 2, wherein said synchronous rectifying means comprise:

a transformer coupler having a primary winding connected to said pulse width modulation means;

a first secondary winding, operated in response to said carrier signal of said first characteristic to provide a first synchronizing signal; and a second secondary winding, operated in response to said carrier signal of said second characteristic to provide a second synchronizing signal;

first switching means connected to said power driving means, and said first secondary winding, operated in response to said power driving signal of positive polarity and said first synchronizing signal to provide said positive output voltage signal;

second switching means connected to said power driving means and said second secondary winding, operated in response to said power driving signal of negative polarity and said second synchronizing signal to provide said positive output voltage signal;

third switching means connected to said power driving means and said first secondary winding, operated in response to said power driving signal of positive polarity and said first synchronizing signal to provide said negative output voltage signal; and fourth switching means connected to said power driving means and said second secondary winding operated in response to said power driving signal of negative polarity and said second synchronizing signal to provide said negative output voltage signal.

10. A power converter as claimed in claim 9, wherein said first, second, third and fourth switching means each comprise first, second, third and fourth transistors, respectively.

11. A power converter as claimed in claim 10, wherein said first switching means further comprise a diode connected in series with said first transistor and in parallel with said third transistor;

said third switching means further comprise a diode connected in series with said third transistor and in parallel with said first transistor;

said second switching means further comprise a diode connected in series with said second transistor and in parallel with said fourth transistor; and said fourth switching means further comprise a diode connected in series with said fourth transistor and in parallel with said second transistor;

said first and third switching means operated to allow current to flow to said load when said load voltage is less than said averaged positive output voltage;

said second and fourth switching means operated to allow current to flow from said load when said load voltage is greater than said averaged negative output voltage;

said second and fourth switching means further operated to allow current to flow from said load when said load voltage is greater than said averaged positive output voltage; and said first and third switching means further operated to allow current to flow to said load when said load voltage is less than said averaged negative output voltage.

12. A power converter as claimed in claim 1, wherein said filter means comprise a low pass filter.

13. A power converter as claimed in claim 1, wherein said voltage control means are further operated in response to an absence of said pulse width modulated signal to present a low impedance to said load.

* * * * *